Patented June 25, 1929.

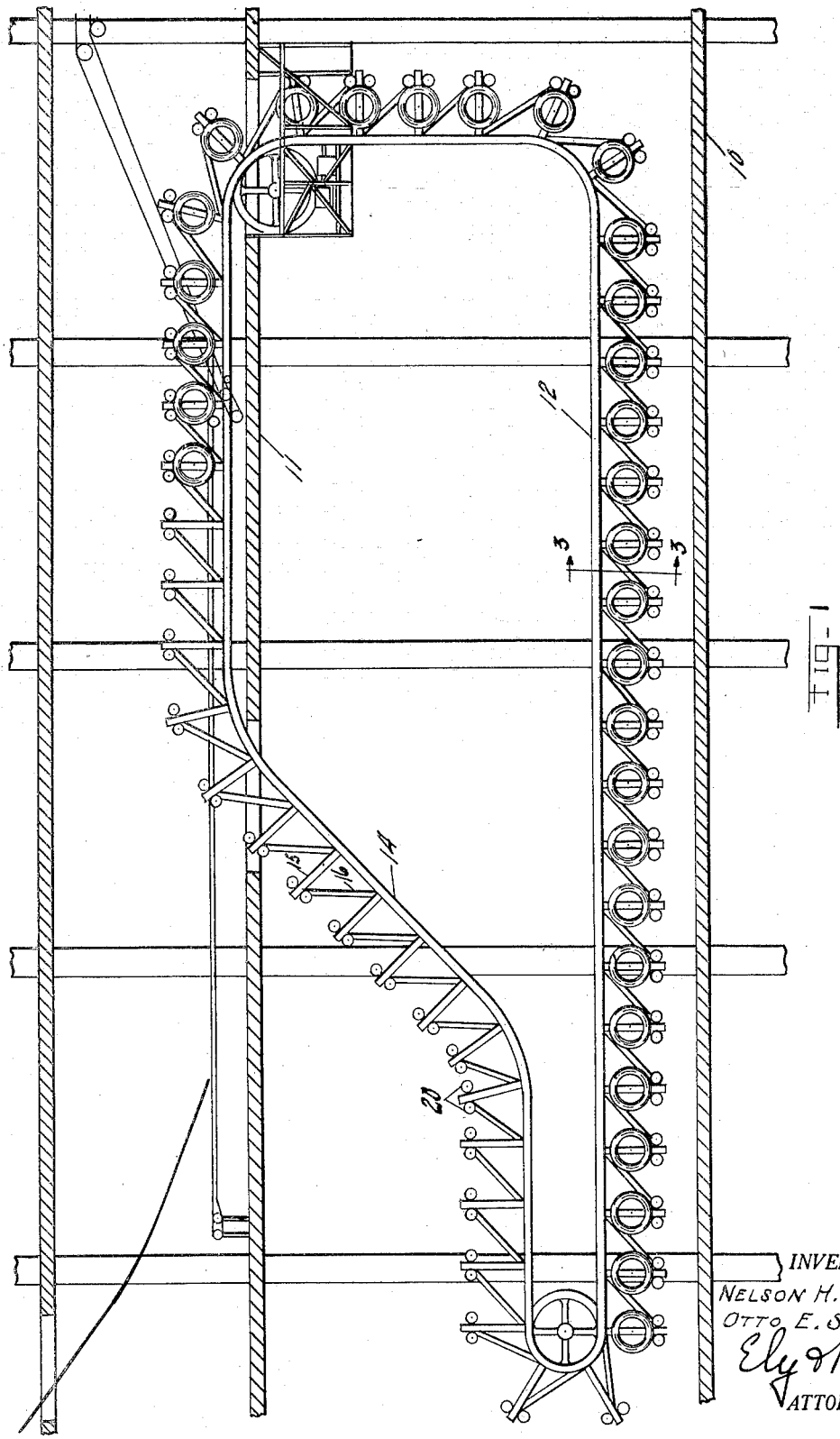

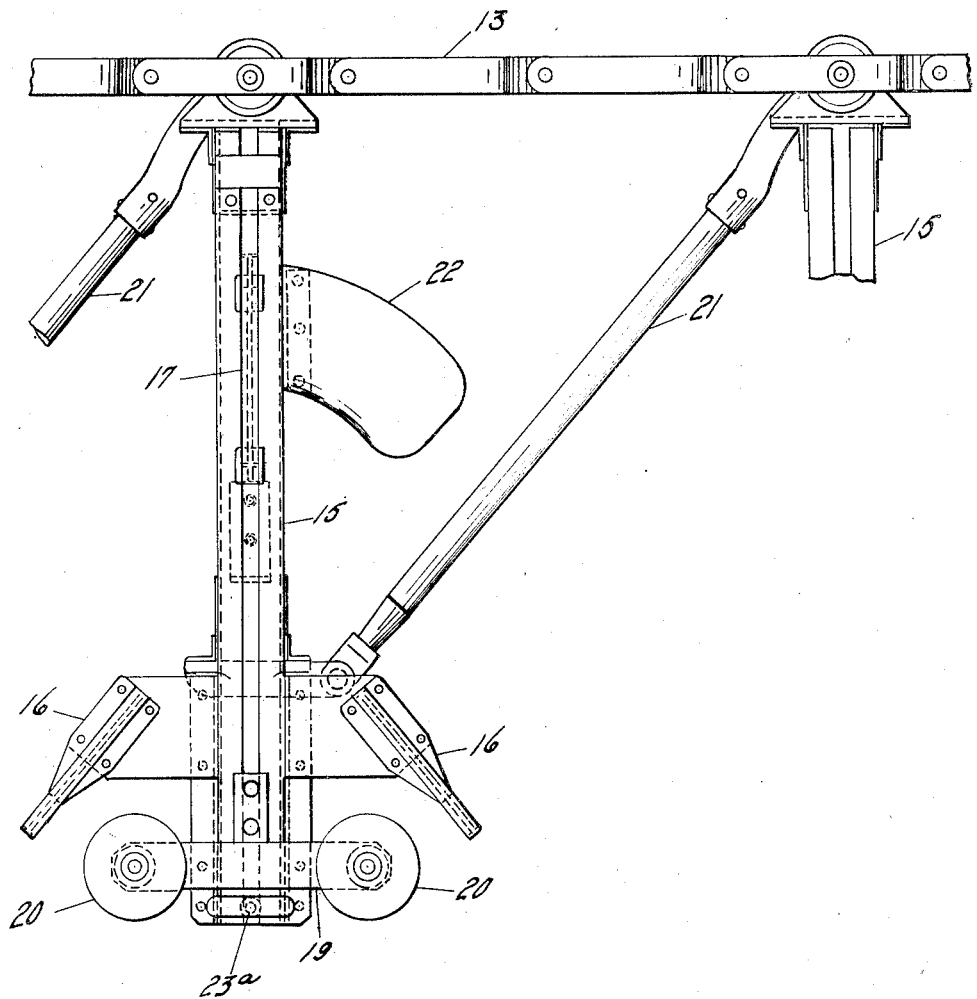

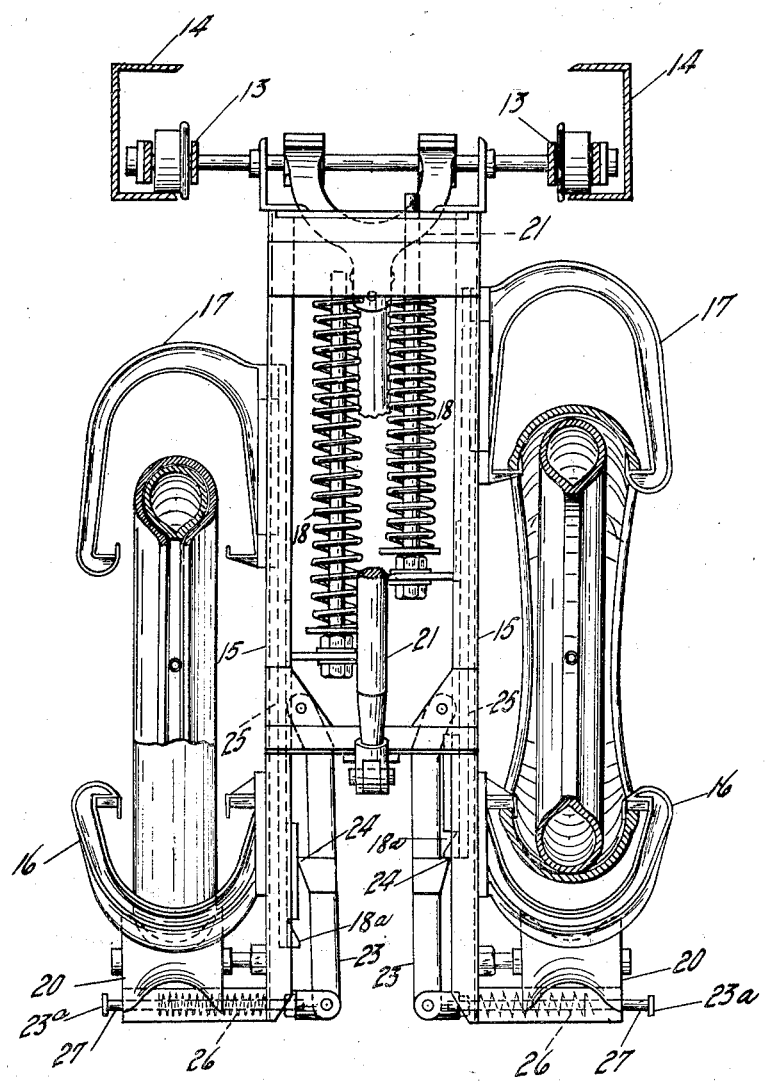

1,718,660

UNITED STATES PATENT OFFICE.

NELSON H. MYERS, OF AKRON, AND OTTO E. SORDS, OF CUYAHOGA FALLS, OHIO, ASSIGNORS TO THE FIRESTONE TIRE AND RUBBER COMPANY, OF AKRON, OHIO, A CORPORATION OF OHIO.

TIRE-PREPARATION CONVEYER.

Application filed August 15, 1927. Serial No. 212,868.

This invention relates to conveyers for use in tire factories. Heretofore it has been customary to carry the tires on a conveyer to operatives who remove and carry them to other operatives who mount the tires in a machine to spread the beads apart to insert the air bag and then to release the tire to contract on the bag. The tires thus prepared are then returned to the conveyer. This entails the use of considerable labor and the loss of considerable time.

The general purpose of this invention is to provide an improved conveyer installation for tire factories including a conveyer adapted to receive and spread apart the beads of a pneumatic tire casing along one reach thereof and to conduct the tires along another reach where operatives may insert pressure bags in the tires and partially inflate the bags in preparation for vulcanization, the spreading means on the conveyer being releasable by these operatives to permit the tires to contract about the inserted bags, and the mounting for the tires adapted to permit rotation thereof on the conveyer to facilitate insertion, inflating or other operations, the conveyer delivering the tires to the vulcanizers ready for insertion in the tire molds.

The foregoing and other purposes are attained by the conveyer installation illustrated in the accompanying drawings and described below.

Of the accompanying drawings,

Figure 1 is a side elevation of a conveyer installation embodying the invention;

Figure 2 is a detail side elevation of a unit of said conveyer; and

Figure 3 is a transverse section therethrough as on line 3—3 of Figure 1.

Referring to the drawings, the numeral 10 designates the floor level in a tire factory at which the tire vulcanizing operations are performed, and the numeral 11 indicates a floor level above level 10 at which the tires may be delivered from the various tire building, finishing and inspecting operatives to be vulcanized.

A conveyer indicated generally by the numeral 12 is arranged with an upper reach transversing the upper level 11 and a lower reach transversing the lower level 10 to carry the tires with the beads spread apart from floor 11 to floor 10 where the bag-inserting and inflating operatives may prepare the tires for vulcanization.

The conveyer 12 comprises chains 13, 13 traveling along a track including rails 14, 14 and having hingedly connected thereon supports 15, 15 for tire spreaders each including relatively fixed, curved hook members 16, 16 at the outer ends of the supports and similar relatively movable, curved hook members 17 slidable on the supports adjacent the inner ends thereof, and preferably being normally urged toward the fixed elements by springs 18, 18, but adapted to be releasably latched in such a position away from elements 16 as to spread apart the beads of a tire engaged by elements 16 and 17, suitable latching devices being indicated at 18ª, 18ª.

To support the tires on the lower reach of the conveyer after releasing the spreader mechanism, a mounting 19 is provided for each tire which preferably includes spaced rollers 20, 20 which permit rotation of the tire upon the mounting to facilitate insertion of pressure bags, inflation thereof or other operations.

The supports 15 are braced by means of links 21, 21 extending from the outer ends of the support to the pivot of an adjacent support upon the conveyer, the supports 15 accordingly being held substantially at right angles to the conveyer throughout its movement. A guard plate 22 may be mounted on each support 15.

The latching and releasing mechanism includes a latch 23 pivoted to hook member 17 and having hook portions 24, 24 thereon for adjustably engaging in notches in a latch plate 25 secured near the outer end of each support 15. For normally urging the latch to engaged position, a spring 26 is employed acting on latch-releasing rod 27 adapted to disengage the latch against the action of this spring by being hingedly connected to the outer end of latch 23 and sliding on the outer end of the support 15, this rod being provided with a projecting end having a head 23ª thereon arranged to be easily engaged by an operative's foot.

In use, the green tires are mounted in and spread by the spreader devices while the conveyer is traveling on the upper floor 11, the spread tires being conveyed downwardly to floor 10 where operatives insert the bags and release the spreaders. Should the valve in a bag be in an inconvenient position, or should there be a kink in the bag at one point, a tire may be rotated on its mounting to bring the valve to a convenient position or the kink to a position at which it can effectively be removed.

Modifications of the invention may be resorted to without departing from the spirit thereof or the scope of the appended claims.

What is claimed is:—

1. In a tire factory, a tire preparation conveyer installation including a conveyer having one reach on the tire vulcanizing floor and another reach on a higher floor level, said conveyer installation including an endless track, an endless conveyer traveling along the track, supports hingedly mounted at their inner ends on the conveyer and extending outwardly therefrom, links connecting the outer ends of the supports with the conveyer to hold the supports substantially perpendicular to the conveyer, relatively fixed tire spreader elements on the outer ends of the supports, tire spreader elements on the inner ends of the supports movable toward and from the outer elements, means normally urging the second-named spreader elements toward the first-named spreader elements, latching means for securing the second-named elements in spread-apart relationship with respect to the first-named spreader elements, means at the outer end of each support for releasing the latching means, and a roller mounting for a tire on the outer end of each support.

2. In a tire conveyer, a tire preparation conveyer installation including a conveyer having one reach on the tire vulcanizing floor and another reach on a higher floor level, said conveyer installation including an endless track, an endless conveyer traveling along the track, supports mounted at heir inner ends on the conveyer and extending outwardly therefrom, relatively fixed tire spreader elements on the outer ends of the supports, tire spreader elements on the inner ends of the supports movable toward and from the outer elements, means normally urging the second-named spreader elements toward the first-named spreader elements, latching means for securing the second-named elements in spread-apart relationship with respect to the first-named spreader elements, means at the outer end of each support for releasing the latching means, and a roller mounting for a tire on the outer end of each support.

3. In a tire factory, a tire preparation conveyer installation including a conveyer having one reach on the tire vulcanizing floor and another reach on a higher floor level, said conveyer installation including an endless track, an endless conveyer traveling along the track, supports mounted at their inner ends on the conveyer and extending outwardly therefrom, relatively fixed tire spreader elements on the outer ends of the supports, tire spreader elements on the inner ends of the supports movable toward and from the outer elements, means normally urging the second-named spreader elements toward the first-named spreader elements, latching means for securing the second-named elements in spread-apart relationship with respect to the first-named spreader elements, means at the outer end of each support for releasing the latching means, and a mounting for a tire on the outer end of each support.

4. In a tire factory, a tire preparation conveyer installation including a conveyer having one reach on the tire vulcanizing floor and another reach on a higher floor level, said conveyer installation including an endless track, an endless conveyer traveling along the track, supports mounted at their inner ends on the conveyer and extending outwardly therefrom, relatively fixed tire spreader elements on the outer ends of the supports, tire spreader elements on the inner ends of the supports movable toward and from the outer elements, means normally urging the second-named spreader elements toward the first-named spreader elements, latching means for securing the second-named elements in spread-apart relationship with respect to the first-named spreader elements, means for releasing the latching means, and a mounting for a tire on the outer end of each support.

5. In a tire factory, a tire preparation conveyer installation including a conveyer having one reach on the tire vulcanizing floor and another reach on a higher floor, said conveyer installation including an endless traveling conveyer, supports on the conveyer, extending outwardly therefrom, tire spreaders on the supports, means for releasably securing the tire spreaders in spread-apart relationship, and a tire mounting on the outer end of each support.

6. In a tire factory, conveyer means for delivering tires in succession to the vulcanizing department with their bead spread apart whereby pressure bags may be inserted therein, and means for releasing the tires to permit contracting of the tires onto the inserted bags and removal of the prepared tires from the conveyer means.

7. That method of preparing tires for vulcanization which comprises spreading the beads of the tires apart, passing the spread tires in succession along a path, inserting pressure bags in said tires, and releasing the tires permitting them to contract onto the bags while they are traveling.

8. That method of preparing tires for vulcanization which comprises spreading the beads of the tires apart, passing the spread tires in succession along a path, and inserting pressure bags in said tires while they are traveling.

9. The combination with a traveling conveyer of tire spreading units mounted upon said conveyer, said units each including a support extending from the conveyer, relatively movable spreader elements on the support, yielding means urging the elements relatively toward each other, means for releasably latching the elements against the action of the yielding means, and means for releasing the latching means.

10. The combination with a traveling conveyer of tire spreading units mounted upon said conveyer, said units each including a support, relatively movable spreader elements on the support, means for releasably latching the elements, and means for releasing the latching means.

11. The combination with a traveling conveyer of tire spreading units mounted upon said conveyer, said units each including a support extending from the conveyer, relatively movable spreader elements on the support, yielding means urging the elements relatively toward each other, and means for releasably latching the elements against the action of the yielding means.

12. The combination with a traveling conveyer of tire spreading units mounted upon said conveyer, said units each including a support, relatively movable spreader elements on the support, and means for releasably latching the elements.

13. The combination with a traveling conveyer of tire spreading units mounted upon said conveyer.

NELSON H. MYERS.
OTTO E. SORDS.